Aug. 31, 1965  E. C. SLOAN ET AL  3,203,807
METHOD AND APPARATUS FOR FORMING A SAUSAGE MEAT PRODUCT
Filed March 12, 1962
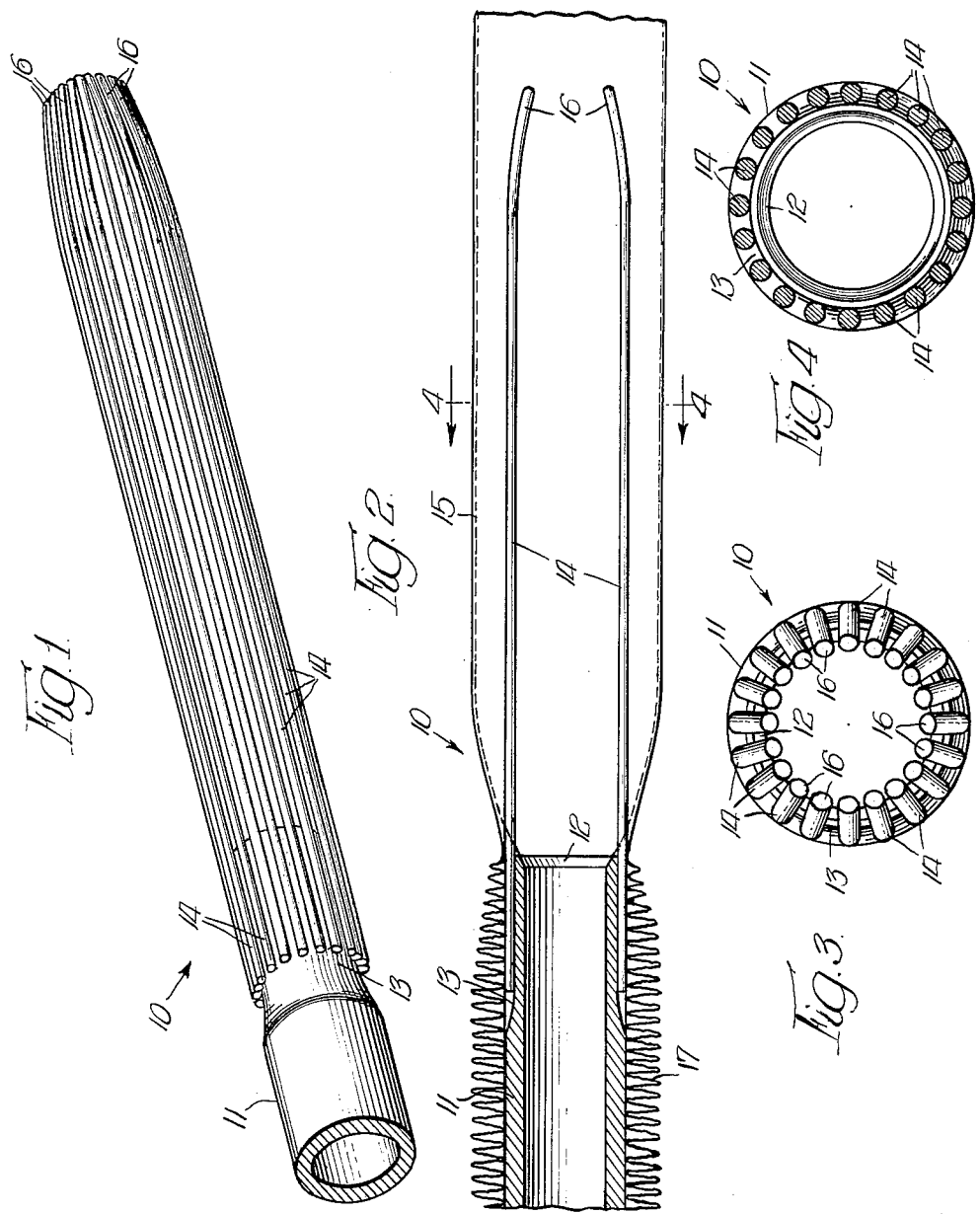
Inventors:
Edward C. Sloan,
Edward Schmook, Jr.,
William D. Paynter,
Elwood W. Kielsmeier,
By Cromwell, Greist & Warden
Attys.

United States Patent Office 3,203,807
Patented Aug. 31, 1965

3,203,807
METHOD AND APPARATUS FOR FORMING A SAUSAGE MEAT PRODUCT
Edward C. Sloan, Sarasota, Fla., and Edward Schmook, Jr., William D. Paynter, and Elwood W. Kielsmeier, Madison, Wis., assignors to Oscar Mayer & Co., Inc., Chicago, Ill., a corporation of Illinois
Filed Mar. 12, 1962, Ser. No. 178,922
6 Claims. (Cl. 99—109)

This invention is directed to improvements in sausage-type products which are stuffed in casings at stuffing speeds or rates which are substantially lower than conventional stuffing speeds or rates, the invention also being directed to a new and improved method of preparing a casing stuffed meat emulsion product involving substantially reduced stuffing speeds or rates. Still further, the invention deals with unique meat emulsion orientation means particularly adapted for use in carrying out the aforesaid method.

Long existing smoked sausage-type product manufacturing methods have involved the steps of preparing an emulsion of comminuted fibrous meat content, extruding the emulsion through a stuffing horn at a high speed into a continuous natural or synthetic casing, tying off the stuffed casing at spaced intervals to establish individual links, treating the links in a smoke house, removing the casing and packaging the individual links. Efforts have been made to improve the procedures followed in the preparation of this type of product, such efforts involving the development of continuous and automatic equipment eliminating at least to a substantial extent the manual handling of the product and accompanying time loss. A continuous manufacturing operation for sausage-type products is disclosed in the copending application of Sloan et al., Serial No. 185,476, filed April 5, 1962. Generally, this continuous operation involves the stuffing of emulsion in a casing at a given rate, automatically and mechanically subdividing the stuffed casing into link segments at the same rate, continuously moving the links through smoke chambers still at the same rate followed by casing removal and packaging on a fully automatic mechanical basis.

With the advent of continuous manufacture of smoked sausage-type products, it has been found that necessary variations from standard procedures unexpectedly result in variations in the properties of the final product. By way of example, at lower controlled stuffing rates preferably utilized in continuous manufacture, the product texture and strength is adversely affected. This invention deals with overcoming the unexpected product degradation experienced in continuous manufacture, although it will be understood that the invention is generally applicable to sausage-type product manufacture not involving continuous operation but wherein the use of lower stuffing speeds are preferred.

It is an object of the invention to provide a new and improved sausage-type meat product including comminuted fibrous meat content which is oriented to a substantial extent and depth in a direction longitudinally of the product, the product further exhibiting surface and subsurface shear induced salt-soluble protein oriented agglomeration longitudinally thereof, these physical properties being responsible for the establishing of adequate product strength and texture.

Another object is to provide a new and improved method of preparing a fibrous meat content oriented product using reduced stuffing speeds.

Still a further object is to provide a new and improved method of extruding and stuffing fibrous meat content emulsion into a casing to obtain desirable product strength and texture control, the method being particularly adapted for utilization in the continuous manufacture of sausage-type products involving the use of low stuffing speeds.

A further object is to provide new and improved apparatus for use in the extrusion of comminuted fibrous meat emulsion, the apparatus operating on the emulsion to provide for fibrous meat content orientation to an improved extent and being particularly adapted for use in the continuous manufacture of sausage-type products involving low stuffing speeds.

Other objects not specifically set forth will become apparent from the following detailed description of the invention made in conjunction with the accompanying drawings wherein:

FIG. 1 is a fragmentary perspective of a stuffing horn assembly including a preferred form of fibrous meat emulsion orientation means forming a part of the invention;

FIG. 2 is a fragmentary longitudinal section of the assembly of FIG. 1;

FIG. 3 is an outer end view of the assembly; and

FIG. 4 is a transverse section of the assembly as viewed generally along line 4—4 in FIG. 2.

In accordance with conventional sausage-type product manufacturing procedures, the meat emulsion is extruded through a stuffing horn into a continuous natural or synthetic casing mounted in bunched condition over the end of the stuffing horn and into which the emulsion is pumped at a relatively high speed. For example, it is not uncommon to carry out conventional casing stuffing operations at a rate of 10 feet per second. Conventional operations will be carried out at a rate of at least about 5 feet per second as it has been generally considered advisable to operate at the highest practical speed to obtain greater efficiency in plant operation.

Successful attempts have been made toward mechanization of standard sausage-type product manufacture and with mechanization it has been found desirable to materially reduce the rate of stuffing. The automatic and continuous movement of sausage-type products, such as wieners, through continuous smoke chambers immediately following stuffing is by necessity the most time consuming part of the overall process. To accommodate this aspect of continuous operation, the attendant operation of stuffing must be materially revised with regard to speed of stuffing. With a reduction in the speed of stuffing, a continuous stream of stuffed and linked casings are delivered onto slowly moving conveyor means which move the product through the smoke chambers as set forth in the aforementioned copending application. Even at the materially reduced stuffing speed and product conveying rate through the smoke chambers, the overall time of wiener manufacture is very materially reduced. By way of example, following conventional procedures in which fast stuffing rates are used, the linked stuffed casings are placed on racks and transported to a smoke house, smoking is completed, the product is removed from the smoke house, the casing is stripped from the product and the wieners are packaged, the time involved may be on the order of 4 to 72 hours. With continuous operation using reduced stuffing rates, the final product may be prepared in as little as 30 minutes and immediately and automatically subjected to skinning and automatic packaging within an additional few minutes. Thus the use of continuous manufacturing procedures on a completely mechanized basis gives rise to distinct advantages. However, additional problems have arisen as a result of the substantial and somewhat drastic deviations from long practiced procedures.

The problem with which this particular invention is concerned involves the loss of strength and texture of a wiener product as a result of using substantially reduced stuffing speeds. By referring to strength and texture, it is meant that the product in its ultimate ready-to-eat condition should exhibit sufficient strength or resistance against transverse breaking, shearing or crumbling under normal handling conditions. Thus a wiener may be readily handled with tongs, fork, etc. during heating as well as during placement in a roll or the like without undesirable breaking or crumbling. As will be subsequently referred to, the strength of a sausage-type product, such as a wiener, can be measured by its resistance to breakage upon the application of opposed twisting forces applied at opposite ends of the product about its longitudinal axis. The degree of twist before breakage or shear is a measure of the strength of the product and its resistance to disintegration during handling. The property of texture is, of course, self-explanatory in that the product should not be too crumbly or too rubbery during chewing thereof. Furthermore, the product must have an acceptable appearance which is related to the texture thereof.

In continuous wiener manufacturing, it is desirable to use a stuffing speed which is very substantially below 5 feet per second. Preferably, the stuffing speed should not substantially exceed 2 feet per second. With this material departure from standard procedures, an unexpected and undesirable loss of strength and texture is evident in the final product. However, it has been found that the requisite or even improved strength and texture properties in the product can be obtained by providing for controlled orientation of the fibrous meat content of the emulsion during stuffing. Additionally, it is important that oriented salt-soluble protein agglomeration also be obtained during stuffing for improved results. Basically, the overall orientation is obtained in accordance with the teachings of the present invention by the embedding of a plurality of relatively rigid finger-like members into surface portions of the emulsion during extrusion or stuffing thereof and one form of suitable apparatus capable of obtaining the improved results is illustrated in the accompanying drawings.

FIGS. 1–4 illustrate a stuffing horn assembly 10 of improved design in accordance with the teachings of the present invention. This assembly includes a tube 11 which is basically of known type commonly referred to as a stuffing horn and which is adapted for connection at one end to a supply of meat emulsion for emulsion delivery therethrough under pressure by suitable pumping equipment or the like. The internal diameter of the tube 11 is substantially less than the ultimate diameter of the stuffed product, the emulsion being forced under compression through the tube 11 and expanding or enlarging out a beveled end opening 12 thereof. The outer surface of the tube just inwardly from the extrusion opening 12 thereof is formed with a circumferential recessed portion 13 in which is mounted a plurality of circumferentially spaced tine-like members, such as rods or wires 14. These wires project substantially outwardly beyond the extrusion opening 12 and are located to become substantially embedded in the emulsion extruded from the tube 11, the shape of the extruded emulsion being illustrated by broken lines in FIG. 2 identified by the numeral 15. The wires 14 at their outermost ends 16 are preferably bowed or inclined slightly inwardly to readily accommodate the introduction of a conventional casing 17 thereon in preparing the assembly 10 for operative use. The casing 17 is mounted in bunched relation about the outer surface of the tube 11 and extends along the outer surfaces of the wires 14 to be engaged by the emulsion 15 as it moves along between and expanded outwardly of the wires 14 and to be drawn into smooth surface confining relation about the emulsion during extrusion in the conventional manner. Thus a continuous casing stuffed sausage-type product is formed followed by spaced linking of the stuffed casing in any suitable manner to form individual linked products. The connected links are ultimately cooked or smoked and the casing is stripped therefrom followed by packaging of the individual links.

The wires 14 may be attached to the circumferentially recessed portion 13 of the tube 11 in any suitable manner such as by silver soldering. Preferably, each wire is formed from stainless steel spring material with each wire being of a diameter of approximately $\frac{1}{32}$ of an inch. Other thicknesses and shapes of wires may be utilized as long as the individual tine-like members are capable of becoming embedded in the emulsion 15 during extrusion thereof and providing for fibrous meat content and salt-soluble protein agglomeration orientation in the direction of extrusion. In the assembly illustrated, a total of about 20 wires may be used to obtain adequate orientation and agglomeration. The wires 14 will preferably project beyond the extrusion opening 12 of the nozzle 11 to an extent of about 4 inches to provide for contact with the emulsion 15 to aid in obtaining the requisite degree of orientation. Any shape of wire or tine-like member may be used as long as the requisite orientation is obtained. Preferably, the cross sectional area of the wires will be kept small in relation to the cross sectional area of the product. In this respect it has been found preferable to use wires of a diameter of about $\frac{1}{32}$ of an inch. Any number of wires may be used depending upon the diameter of the product being formed. The number of wires used also influences the amount of orientation obtained at any specific diameter. It is also possible to obtain more orientation by using two concentric rings of wires. The length of the wires of other suitable tine-like members will vary depending upon the degree of orientation required. Wires arranged in the manner illustrated in the accompanying drawing should extend at least about an inch beyond the extrusion opening 12.

The product obtained as a result of the practice of the method of the invention is different from that which is obtained using conventional stuffing practices. While the content of the product remains the same, the degree of fibrous meat content orientation is less than that found in a conventional product. However, any undesirable loss in strength and texture as a result of reduced fibrous meat content orientation is recovered by the presence of shear induced, oriented agglomeration of the salt-soluble protein content. While some agglomeration per se of the salt-soluble protein content will occur during slow stuffing operations, such agglomeration will not be oriented longitudinally of the product. Thus the oriented agglomeration induced by the shearing action of the wires 14 imparts to the product of the present invention the remaining degree of strength and texture which makes up for the lack of complete or adequate fibrous meat content orientation. Preferably, the depth of orientation will extend to approximately midway between the surface and the center of the link product. Also, preferably, the orientation will be present in at least about 50% of the link product.

As described above, the strength of a wiener may be measured in accordance with a standard procedure involving the use of an instrument which measures the degree to which an axial slice of wiener product may be twisted up to shearing thereof. The testing procedure and type of instrument is described in the publication of Hashimoto et al., "Effect of Storage Conditions on Some of the Biochemical Properties of Meat and on the Physical Properties of an Experimental Sausage," Food Research 24, 185, 1959. The following comparative results have been obtained, which results illustrate the strength improvements available from orientation during low speed stuffing and are expressed as the degree of twist reached at initial shearing.

| Wieners Stuffed at 9 Feet Per Second Without Mechanical Orientation | Wieners Stuffed at ⅓ Foot Per Second Without Mechanical Orientation | Wieners Stuffed at ⅓ Foot Per Second With Mechanical Orientation |
|---|---|---|
| 251 | 132 | 256 |
| 275 | 138 | 226 |
| 270 | 150 | 232 |
| 304 | 145 | 231 |
| 241 | 156 | 226 |
| 220 | 171 | 273 |
| 252 | 131 | 263 |
| 242 | 142 | 229 |
| ¹257 | ¹146 | ¹254 |

¹ Average.

From the foregoing it will be noted that at low speed stuffing there is a very substantial loss of product strength in the absence of mechanical orientation. However, with mechanical orientation of the type disclosed herein, there is a marked improvement in product strength.

The advantages of mechanically controlled fibrous meat content and salt-soluble protein agglomeration orientation are of course available at higher rates of stuffing where further improved strength and texture properties are desired. However, it will be readily appreciated that at substantially lower rates of stuffing, the absence of such orientation results in the forming of an inferior product. Thus a singular problem not heretofore present and arising solely as a result of a substantial variation from standard manufacturing procedures is overcome in an uncomplicated, economical manner. Preferably, the tine-like orientation members will become embedded in the emulsion to a substantial extent to obtain adequate orientation. While the principles of the invention have been described in connection with the use of a casing, it will be understood that mechanically induced and controlled orientation can be useful where the shape of the product is maintained by use of other means or techniques.

Obviously certain modifications and variations of the invention as hereinbefore set forth may be made without departing from the spirit and scope thereof and therefore only such limitations should be imposed as are indicated in the appended claims.

We claim:
1. The method of forming a sausage meat product of improved strength and texture, said method comprising extruding an emulsion containing comminuted fibrous meat into product shape at a rate of substantially less than 5 feet per second while embedding a plurality of spaced finger members into surface portions of the emulsion substantially throughout the entire surface thereof during said extrusion to obtain fibrous meat content orientation longitudinally of the product, whereby said product is of improved texture and of sufficient strength to resist against transverse breaking, shearing and crumbling under normal handling conditions.

2. The method of forming a sausage meat product of improved strength and texture, said method comprising extruding an emulsion containing comminuted fibrous meat into a casing at a rate substantially less than 5 feet per second while embedding finger members in said emulsion during said extrusion to a substantial extent and depth throughout the surface of said emulsion to obtain fibrous meat content orientation and shear induced salt-soluble protein content orientation longitudinally of the product formed, cooking said product in said casing, and thereafter removing said casing, whereby said product is of improved texture and of sufficient strength to resist against transverse breaking, shearing and crumbling under normal handling conditions.

3. The method of forming a sausage meat product of improved strength and texture, said method comprising extruding an emulsion containing comminuted fibrous meat into product shape at a rate which is no greater than about 2 feet per second while embedding a plurality of spaced finger members into surface portions of the emulsion substantially throughout the entire surface thereof during said extrusion to obtain fibrous meat content orientation longitudinally of the product, whereby said product is of improved texture and of sufficient strength to resist against transverse breaking, shearing and crumbling under normal handling conditions.

4. The method of forming a sausage meat product of improved strength and texture, said method comprising extruding an emulsion containing comminuted fibrous meat into a casing at a rate of not substantially greater than 2 feet per second while embedding finger members in said emulsion during said extrusion to a substantial extent and depth throughout the surface of said emulsion to obtain fibrous meat content orientation and shear induced salt-soluble protein content orientation longitudinally of the product formed, cooking said product in said casing, and thereafter removing said casing, whereby said product is of improved texture and of sufficient strength to resist against transverse breaking, shearing and crumbling under normal handling conditions.

5. Meat emulsion extrusion and orientation means for use in forming casing stuffed sausage products at low stuffing rates, said extrusion and orientation means comprising an extrusion nozzle of annular configuration through which meat emulsion is extruded into a casing, and an annular complement of circumferentially spaced finger members fixed to said nozzle at least adjacent the discharge end thereof and projecting beyond the discharge end of said nozzle to constitute an annular extension of said nozzle parallel to the longitudinal axis of said nozzle with a diameter which is substantially equal to the diameter of said nozzle, whereby meat emulsion extruded from said nozzle into a casing received about said nozzle and finger members will move along and between said finger members which become substantially embedded in said emulsion to orient fibrous meat content longitudinally of the stuffed product.

6. The extrusion and orientation means of claim 5 wherein the outermost end portions of said finger members are inclined inwardly to increase the depth of embedding in said emulsion.

References Cited by the Examiner

UNITED STATES PATENTS 2,325,446 7/43 Walter _____ 17—41
2,799,585 7/57 Hensgen et al. _____ 99—109

FOREIGN PATENTS 913,033 6/54 Germany.

A. LOUIS MONACELL, *Primary Examiner.*
HYMAN LORD, *Examiner.*